United States Patent [19]

Romeo

[11] Patent Number: 4,969,805

[45] Date of Patent: Nov. 13, 1990

[54] UNIDIRECTIONAL TURBOCHARGER ASSEMBLY

[75] Inventor: Paul S. Romeo, Los Angeles, Calif.

[73] Assignee: Allied-Signal Inc., Morris County, N.J.

[21] Appl. No.: 346,622

[22] Filed: May 2, 1989

[51] Int. Cl.⁵ ............................................ F04B 17/00
[52] U.S. Cl. ..................................... 417/360; 417/407
[58] Field of Search ................. 417/405, 406, 407, 360

[56] References Cited

U.S. PATENT DOCUMENTS

| | | | |
|---|---|---|---|
| 2,918,207 | 12/1959 | Moore | 417/407 |
| 3,017,230 | 1/1962 | Meermans | 417/407 |
| 3,054,554 | 9/1962 | Buchi | 417/407 |
| 3,969,804 | 7/1976 | MacInnes et al. | 417/407 |
| 4,235,484 | 11/1980 | Owen et al. | 417/407 |
| 4,364,717 | 12/1982 | Schippers et al. | 417/407 |
| 4,676,717 | 6/1987 | Willyard et al. | 417/407 |
| 4,704,075 | 11/1987 | Johnston et al. | 417/407 |

Primary Examiner—Louis J. Casaregola
Assistant Examiner—Timothy S. Thorpe
Attorney, Agent, or Firm—Kelly Bauersfeld & Lowry

[57] ABSTRACT

An improved turbocharger assembly is provided wherein the turbocharger components can be assembled quickly and easily along a single axis and at a single work station without requiring inversion or other special handling of partially assembled components. The turbocharger assembly includes a center housing and associated rotating components adapted to mount in stacked succession onto a turbine housing, followed by installation of a compressor housing to complete the turbocharger assembly.

18 Claims, 8 Drawing Sheets

UNIDIRECTIONAL TURBOCHARGER ASSEMBLY

BACKGROUND OF THE INVENTION

This invention relates generally to turbochargers and related methods of assembly. More specifically, this invention relates to an improved turbocharger construction adapted for rapid and easy assembly of turbocharger components along a single axis at a single work station.

Turbochargers and turbocharger systems in general are known for supplying a combustion engine with a charge of air under pressure, commonly referred to as charge air. The turbocharger typically comprises a turbine wheel and a compressor impeller mounted for rotation with a common shaft. The turbine wheel and compressor impeller are positioned within turbine and compressor housings, respectively, which are in turn normally connected to a so-called center housing including appropriate bearing components for supporting the rotating shaft. Exhaust gases from a combustion engine are coupled for passage through the turbine housing to rotatably drive the turbine wheel, whereby the rotating turbine wheel corresponding drives the compressor impeller to compress ambient air for supply as charge air to the engine air intake. This flow of compressed charge air effectively increases the total mass flow through the engine to permit engine operation at increased performance levels with increased power output.

In the past, turbocharger design efforts have focused predominantly upon improvements in aerodynamic performance and mechanical operation. In particular, significant design efforts have been directed toward enhancing aerodynamic efficiency with respect to the turbine wheel and/or the compressor impeller and their related gas flow passages through the turbine and compressor housings. Other substantial design activity has been directed toward improvements in bearing design and lubrication to achieve high speed shaft rotation with prolonged operating life. Relatively minimal design activity has focused upon simplification of the turbocharger components for purposes of easier component assembly with significantly reduced labor time.

More specifically, according to conventional turbocharger constructions, modern turbochargers are assembled by a succession of relatively complex and tedious steps which require significant special handling and the use of customized tools. In a typical assembly process, a turbine wheel and integral shaft are initially assembled with the center housing in combination with appropriate journal and thrust bearing components. The compressor impeller is then attached to the shaft to produce a center housing rotating subassembly. This subassembly is subsequently coupled with appropriate turbine and compressor housing components to complete the turbocharger construction. Unfortunately, this assembly sequence requires the center housing to be inverted several times as the various components are mounted in place. As the assembly process proceeds, the partially assembled turbocharger is normally transferred through a sequence of work stations having unique custom support fixtures. Moreover, a variety of mounting bolts or the like are required to be installed at locations which are difficult to reach and/or often require customized tools to tighten the bolts. As a result, assembly of the turbocharger components entails significant manual labor and time.

The above-described complexities relating to turbocharger manufacturing processes yield corresponding disadvantages in the repair or rebuilding of used turbochargers. More specifically, in operation, a turbocharger is normally mounted at a relatively confined position on or adjacent to a combustion engine. The space limitations have generally prohibited partial disassembly of the turbocharger for repair or maintenance, without first removing the entire turbocharger unit from the engine. Once removed, the turbocharger must be disassembled for repair and then re-assembled according to the same inefficient methods used for original manufacture.

The present invention provides an improved turbocharger assembly which is specifically designed to facilitate the manufacturing process by significantly reducing the time and labor involved in the assembly of turbocharger components. In particular, the turbocharger assembly of the present invention provides a plurality of components adapted for stack-up installation along a single axis at a single work station.

SUMMARY OF THE INVENTION

In accordance with the invention, an improved turbocharger assembly and related method are provided to reduce the time and labor involved in the assembly of turbocharger components. The turbocharger components are adapted for rapid assembly in stacked succession along a single axis and at a single manufacturing station. Specialized tools or other special handling steps are not required.

In the preferred form of the invention, a turbine housing is adapted for connection by bolts or the like to a center housing, which is adapted in turn for connection by bolts or the like to a compressor housing. These mounting bolts are positioned for installation along parallel axes and from a common end of the assembled turbocharger, thereby permitting the components to be assembled in stacked succession without inversion or other special handling. The geometry of the various housing components is chosen for substantially unrestricted access to all mounting bolts, thereby permitting the bolts to be located and tightened without difficulty and without the use of special tools. Separate sets of bolts may be provided for separately connecting the center housing respectively to the turbine and compressor housings. Alternately, a single set of elongated bolts can be provided for securely sandwiching the center housing between the turbine and compressor housings.

The various internal components of the turbocharger are similarly adapted for stack-up assembly from the same direction in coordination with the housing components. More specifically, in a preferred sequence, the turbine housing is supported on a fixture to upwardly expose an inboard side of the turbine housing for drop-in reception of a turbine wheel joined to an elongated turbocharger shaft. A turbine end heat shield is seated at the inboard side of the turbine housing, and journal bearing components are slidingly installed over the shaft. The center housing is then installed by simple slide-on fit over the shaft and bearing components, followed by bolt-on attachment to the turbine housing. A compressor backplate preassembled with a thrust bearing unit is seated upon the center housing and appropriately fastened thereto by mounting bolts. A compressor impeller is attached to the end of the turbocharger shaft, and a compressor housing is mounted by additional bolts or the like onto the compressor backplate. Importantly, with this sequence, all of the various mounting bolts are substantially fully exposed at the time of installation and tightening, and are mounted with their bolts shanks projecting downwardly along parallel axes.

Other features and advantages of the present invention will become more apparent in the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
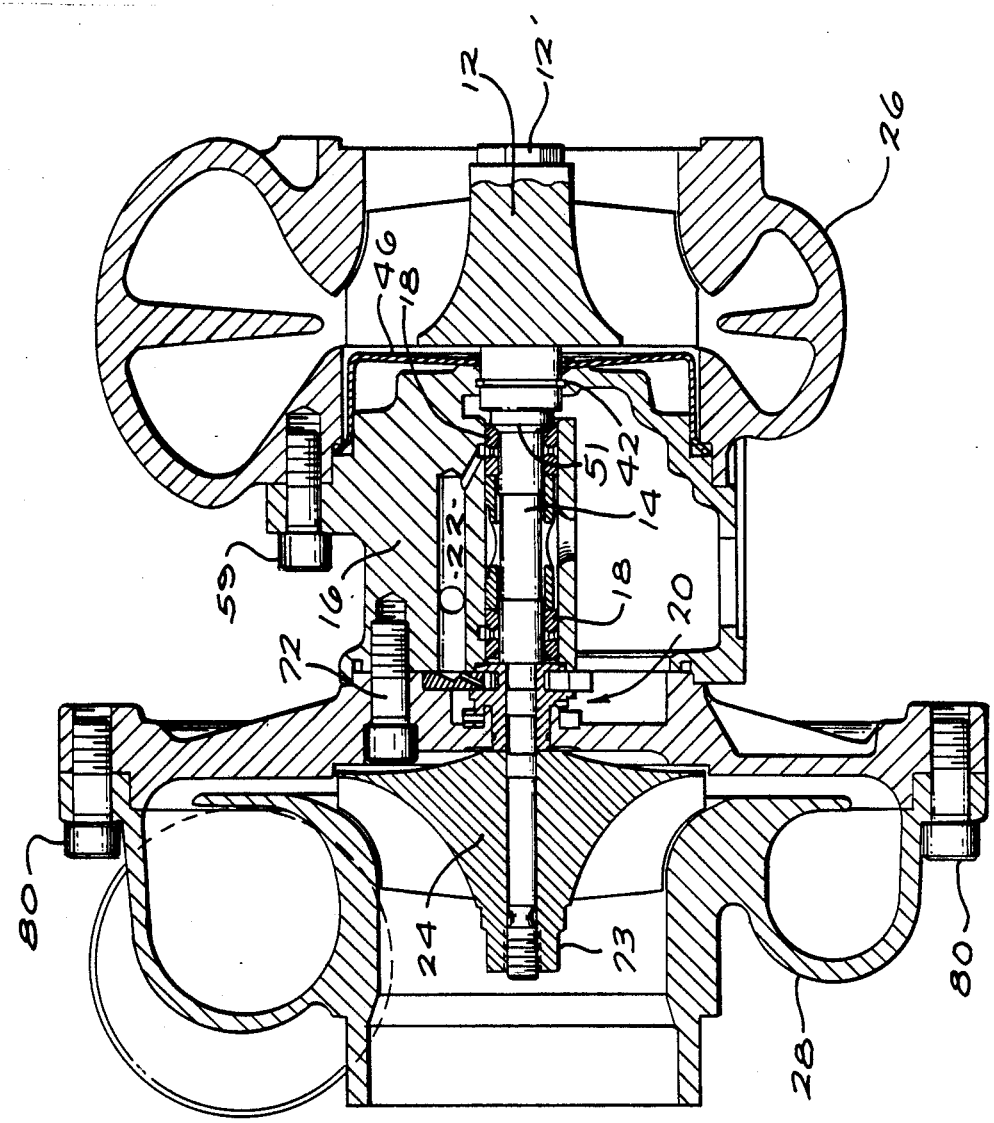
FIG. 1 is a longitudinal vertical sectional view of a turbocharger assembly embodying the novel features of the invention.

As shown in the exemplary drawings, an improved turbocharger assembly referred to generally by the reference numeral 10 is provided for relatively quick and easy assembly of turbocharger components along a single axis at a single manufacturing work station. The turbocharger assembly 10 is designed to minimize the time and labor involved in the manufacturing process, without altering the overall turbocharger performance and reliability in operation. The reduction in manufacturing time and labor beneficially results in increased production rates at reduced unit cost.

The overall functional operation of the turbocharger assembly 10 is known in the art. More specifically, as viewed in FIG. 1, the turbocharger assembly comprises a turbine wheel 12 connected or integrally formed with an elongated shaft 14. This shaft 14 extends through and is supported within a center housing 16 by appropriate journal bearings 18 and a thrust bearing unit 20, all of which are appropriately supplied with lubricating oil via an oil flow gallery passage 22 or the like. The end of the shaft 14 opposite the turbine wheel 12 is mounted to a compressor impeller 24, such that the turbine wheel 14 and and the compressor impeller 24 rotate together with the shaft 14.

A turbine housing 26 is mounted on the center housing 16 and defines aerodynamically shaped passages through which hot exhaust gases expelled from an engine (not shown) flow into driving relation with the turbine wheel 12. The thus-driven turbine wheel correspondingly rotates the compressor impeller 24, which is located within a compressor housing 28 mounted onto the center housing 16. The rotating impeller 24 functions to draw ambient air into the compressor housing 28 for compression and supply as charge air to the intake of the engine, all in a manner well known to those skilled in the art.

In accordance with the primary aspect of the turbocharger 10 of the present invention, the above-referenced components of the turbocharger are designed for quick and easy assembly as a succession of components stacked along a single axis. Significant manual handling of partially assembled components is not required, especially with respect to inversion of subassemblies to accommodate conventional manufacturing assembly processes. Moreover, the entire turbocharger can be assembled at a single work station, without requiring transfer of partially assembled components through a succession of stations and fixtures, according to conventional assembly processes. Still further, the turbocharger components are designed for facilitated manual assembly of components by drop-in placement or the like, or otherwise with the use of conventional tools for tightening mounting bolts which are exposed for easy access.

Figure 2:
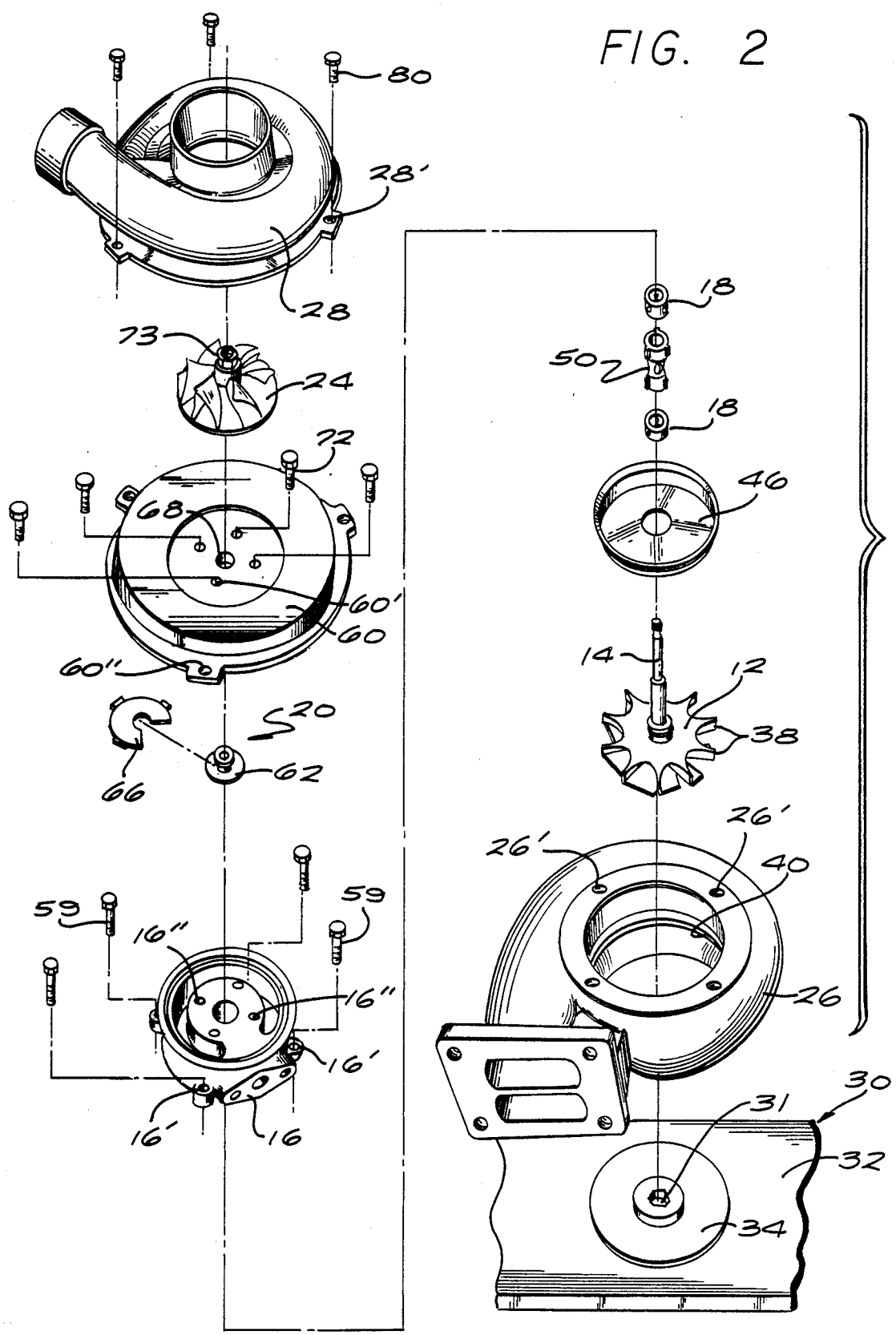
FIG. 2 is an exploded perspective view depicting assembly of the various turbocharger components.
Figure 3:
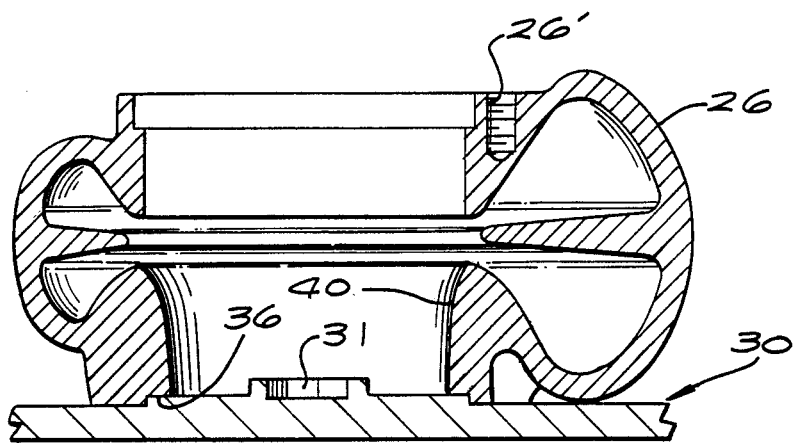
FIG. 3 is an enlarged sectional view illustrating initial placement of a turbine housing onto a support fixture at a single manufacturing station.

As shown in FIGS. 2 and 3, as an initial step in the assembly of the turbocharger components, the turbine housing 26 is rested upon a suitable fixture 30 at a work station. The illustrative fixture 30 comprises a generally horizontal platform 32 interrupted by a short upstanding circular disk 34 sized to seat within a shallow annular counterbore 36 at the outboard side of the turbine housing. In this regard, the turbine housing 26 is conventionally constructed as a relatively heavy steel casting or the like designed to withstand relatively high operating temperatures encountered in the course of exposure to hot engine exhaust gases. This turbine housing 26 is normally the largest and heaviest component of the turbocharger assembly and is conveniently placed first onto the fixture 30 to avoid further handling during the assembly process.

Figure 4:
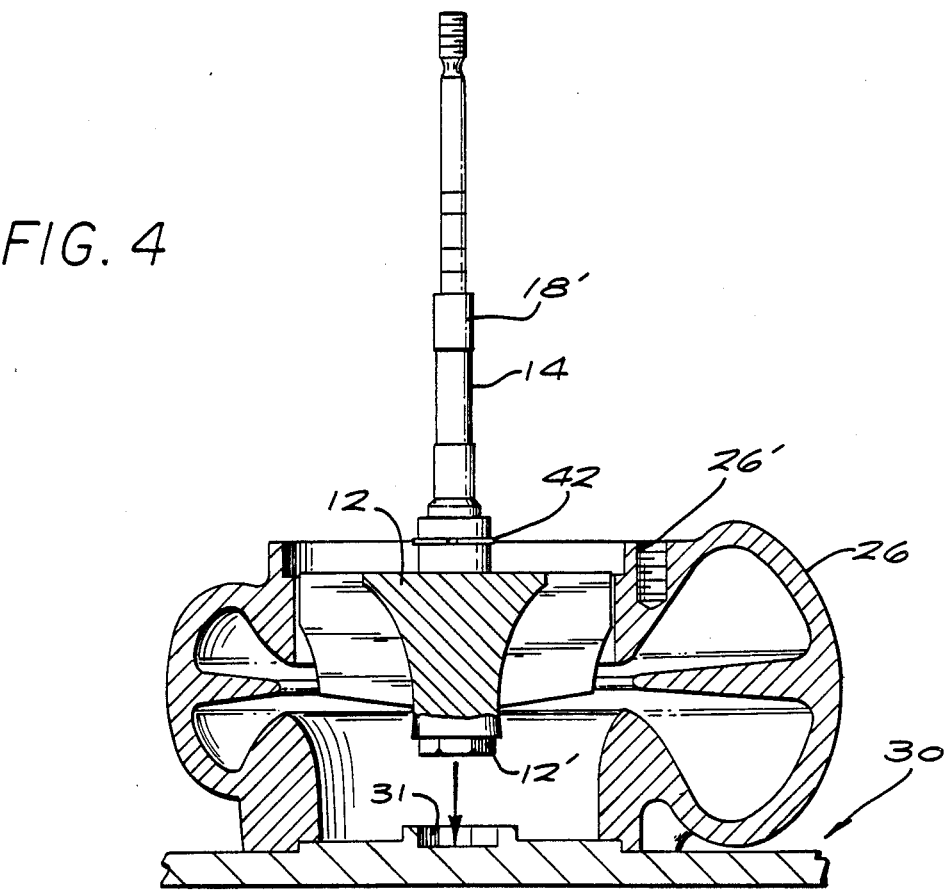
FIG. 4 is a partially exploded sectional view similar to FIG. 3, and depicting drop-in placement of a turbine wheel and turbocharger shaft.
Figure 5:
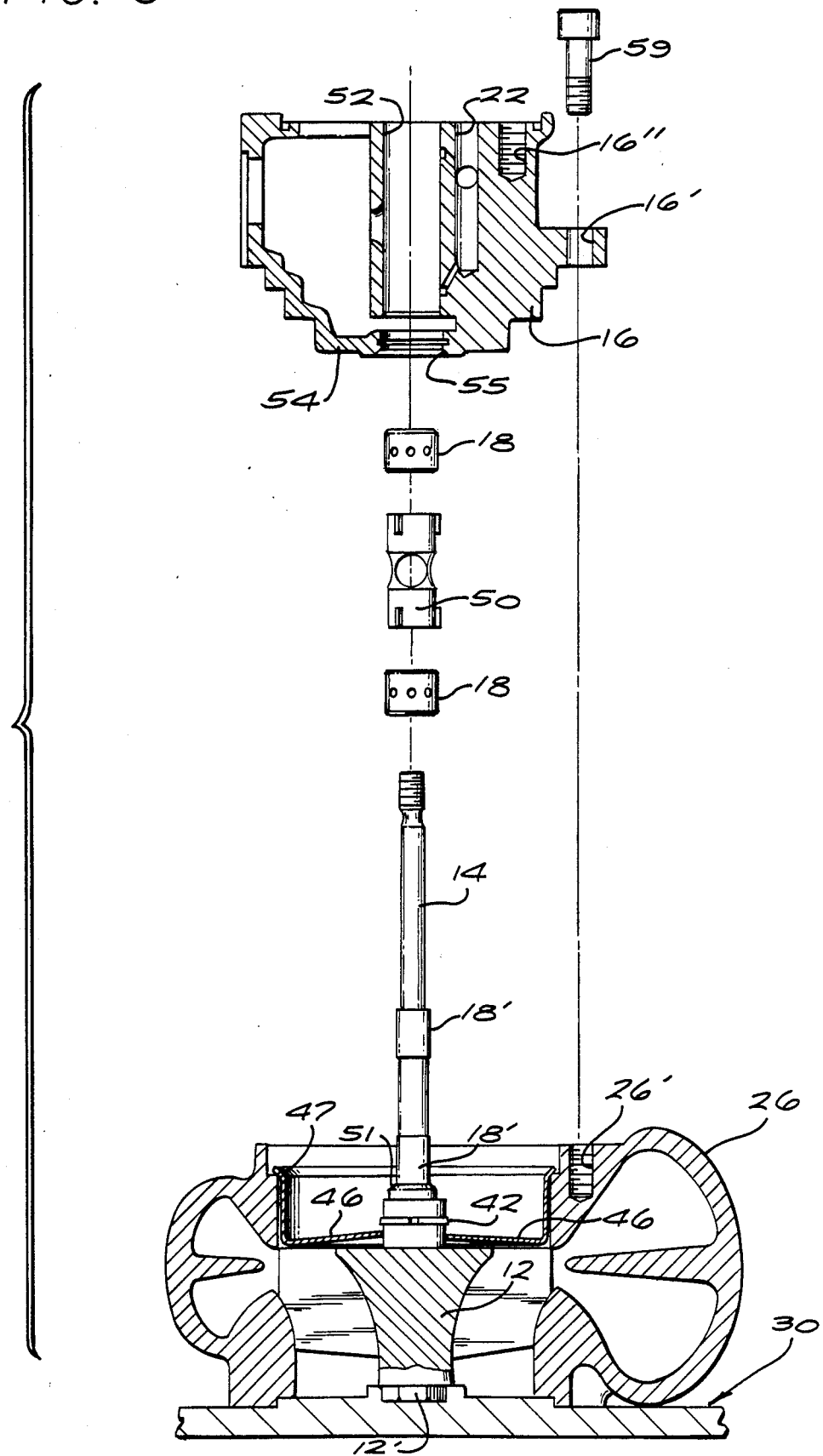
FIG. 5 is an exploded perspective view depicting installation of journal bearing components and a turbocharger center housing.

As viewed in FIGS. 2, 4 and 5, the turbine wheel 12 is placed in a simple drop-in manner through the upwardly exposed inboard side of the turbine housing 26. The turbine wheel comprises an aerodynamically contoured array of vanes 38 adapted for operational rotation in close proximity with matingly contoured volute surfaces 40 within the turbine housing 26. Accordingly, simple drop-in placement of the turbine wheel 12 rests the turbine wheel gently upon underlying volute surfaces 40 (FIG. 3) for purposes of supporting the turbine wheel, near its final assembly position. In this position a hexagonal nose 12, of the turbine wheel 12 conveniently seats within a hex socket 31 of the fixture to lock the turbine wheel against rotation during assembly of the turbocharger.

The turbine wheel 12 is normally preassembled or formed integrally with the turbocharger shaft 14. A turbine end piston ring 42 is prepositioned within a ring groove 44 near the inboard side of the turbine wheel 12. From the piston ring 42, the illustrative shaft 14 projects upwardly and defines a combination of steps and bearing lands 18, for registry with bearing components, as will be described in more detail. The upper end of the shaft 14 includes integral threads 45 for attachment to the compressor impeller 24.

Subsequent to nested placement of the turbine wheel 12, a turbine end heat shield 46 of stamped metal or the like is placed over the upstanding shaft 14. The heat shield 46 has a generally cup-shaped configuration with a circumferential rim 47 adapted to fit within an annular seat 48 at the inboard side of the turbine housing. The journal bearing components are then slid quickly and easily over the shaft 14, as viewed best in FIG. 5. While the specific construction and geometry of the journal bearing components may vary, a preferred set of components comprises a pair of conventional floating sleeve bearings 18 which are maintained about the shaft lands 18' by a intermediate spacer sleeve 50. The journal bearings 18 and the spacer sleeve 50 are in turn retained axially between a stepped shoulder 51 on the shaft 14 and the thrust bearing unit 20. Further details regarding the preferred construction and operation of these bearing components, including the spacer sleeve 50, are found in copending U.S. Ser. No. (345,990), filed concurrently herewith, and which is incorporated by reference herein.

Figure 6:
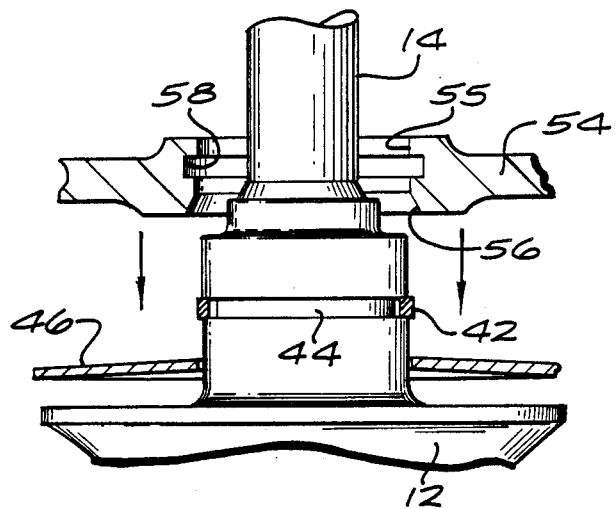
FIG. 6 is an enlarged fragmented and partially exploded view similar to portion of FIG. 5, and illustrating precision placement of the center housing about the turbocharger shaft.
Figure 7:
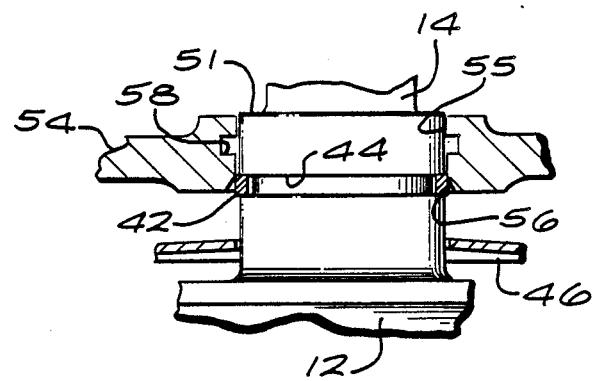
FIG. 7 is a fragmented view similar to FIG. 6, and illustrating engagement between the center housing and a piston ring carried by the turbocharger shaft.

The center housing 16 is installed quickly and easily about the shaft 14 by simple manual slide-on placement. More particularly, as shown in FIG. 5, the center housing 16 is moved downwardly with a sliding action to capture the journal bearings 18 and the spacer sleeve 50 within an elongated cylindrical bearing bore 52 within the center housing. A turbine end wall 54 of the center housing has a central opening 55 therein surrounded by a chamfered leading edge 56 for engaging and radially compressing the piston ring 42 on the shaft 14, as shown in FIGS. 6 and 7. Such radial compression of the piston ring 42 reduces the diametric size of the piston ring for sliding displacement into and diametric expansion within a ring groove 58 lining the central opening 55. Conveniently, the diametric expansion of the piston ring within the groove 48 is accompanied by an audible click which confirms proper axial placement of the center housing 16 about the shaft 14.

The thus-positioned center housing 16 is fastened securely and easily to the underlying turbine housing 26 by means of a plurality of mounting bolts 59 or the like. These bolts are passed easily through appropriate bolt flanges 16' on the exterior of the center housing for threaded advancement into aligned threaded bores 26' at the inboard side of the turbine housing. This bolt locating and tightening step is performed easily and without the use of special tools by virtue of substantially unrestricted access at this stage of turbocharger assembly. As viewed in FIG. 5, such mounting of the center housing 16 securely traps the heat shield 46 in the desired location.

Figure 8:
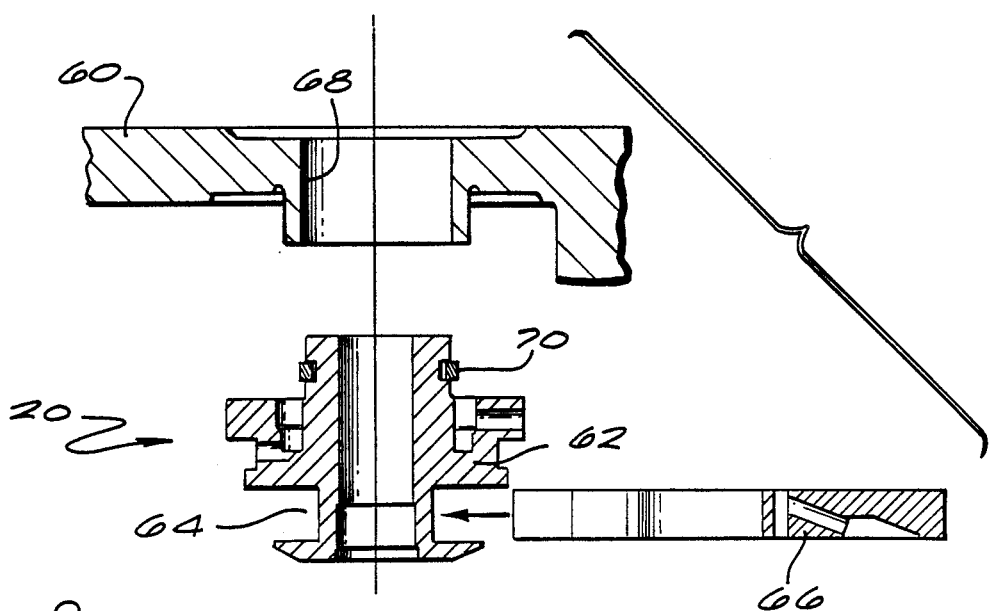
FIG. 8 is an exploded fragmented sectional view illustrating assembly of a thrust bearing unit with a compressor backplate.
Figure 9:
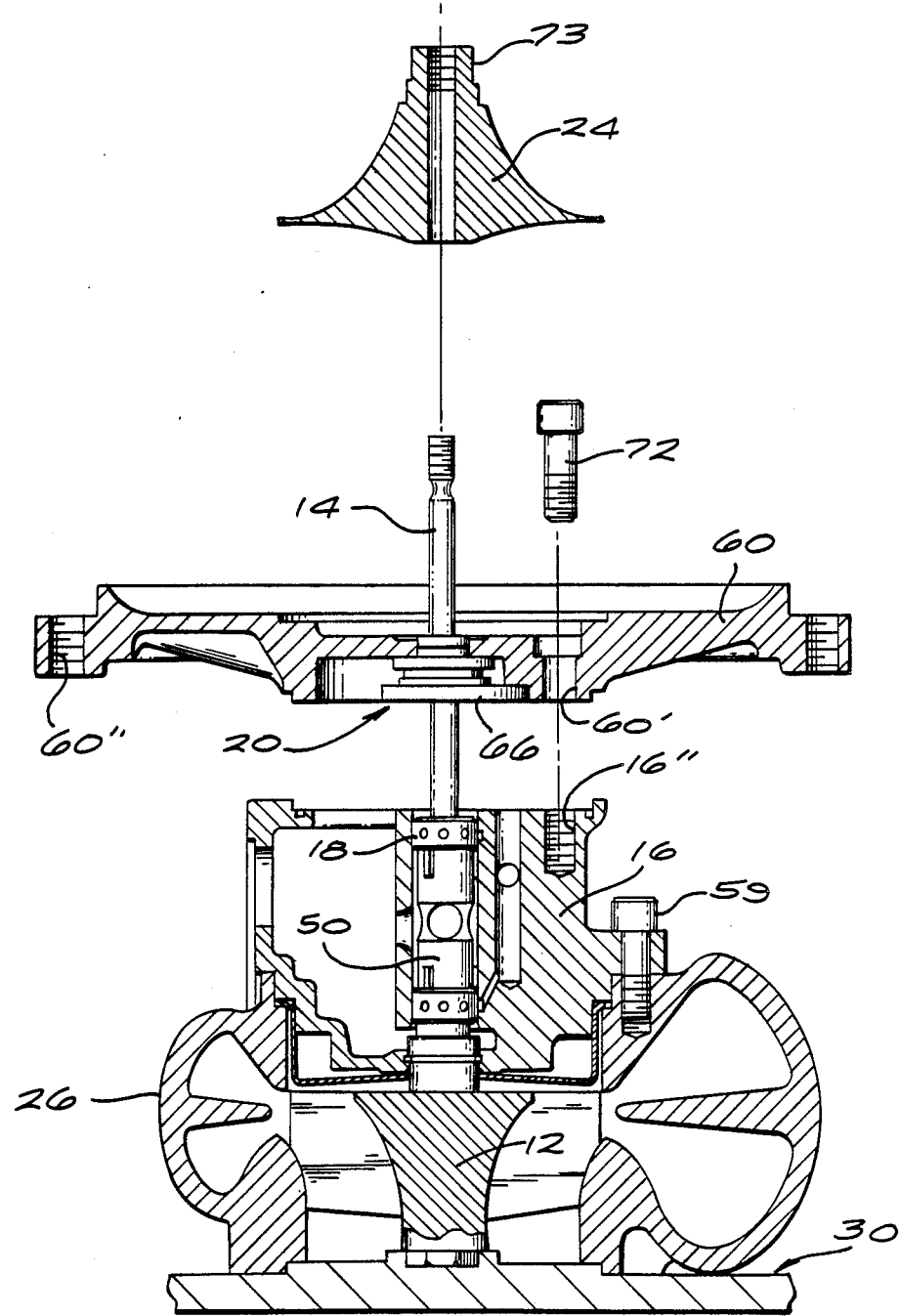
FIG. 9 is an exploded sectional view showing assembly of the compressor backplate and a compressor impeller with underlying portions of the turbocharger.

The thrust bearing unit 20 is next assembled with a compressor backplate 60, as shown in FIGS. 8 and 9. In this regard, the thrust bearing unit 20 has a generally conventional geometry to include a stepped thrust collar 62 defining an annular outer recess 64 for slide-in reception of a horseshoe-shaped thrust bearing 66. This thrust bearing unit or subassembly is then seated within a central bore 68 of the backplate 60, with a piston ring 70 or the like on the thrust collar 62 conveniently riding within the backplate bore 68 to protect against undesired oil leakage during turbocharger operation. As shown in FIG. 9, the compressor backplate 60 is then placed quickly and easily onto the center housing 16 and securely fastened in place by mounting bolts 72 or the like. Once again, these mounting bolts are easily installed through exposed bolt holes 60' in the backplate for threaded reception into aligned bores 16" in the center housing. As shown in FIG. 9, the mounting locations of the bolts 72 may be chosen to be located axially behind the compressor impeller 24 to avoid interference with aerodynamic performance.

Figure 10:
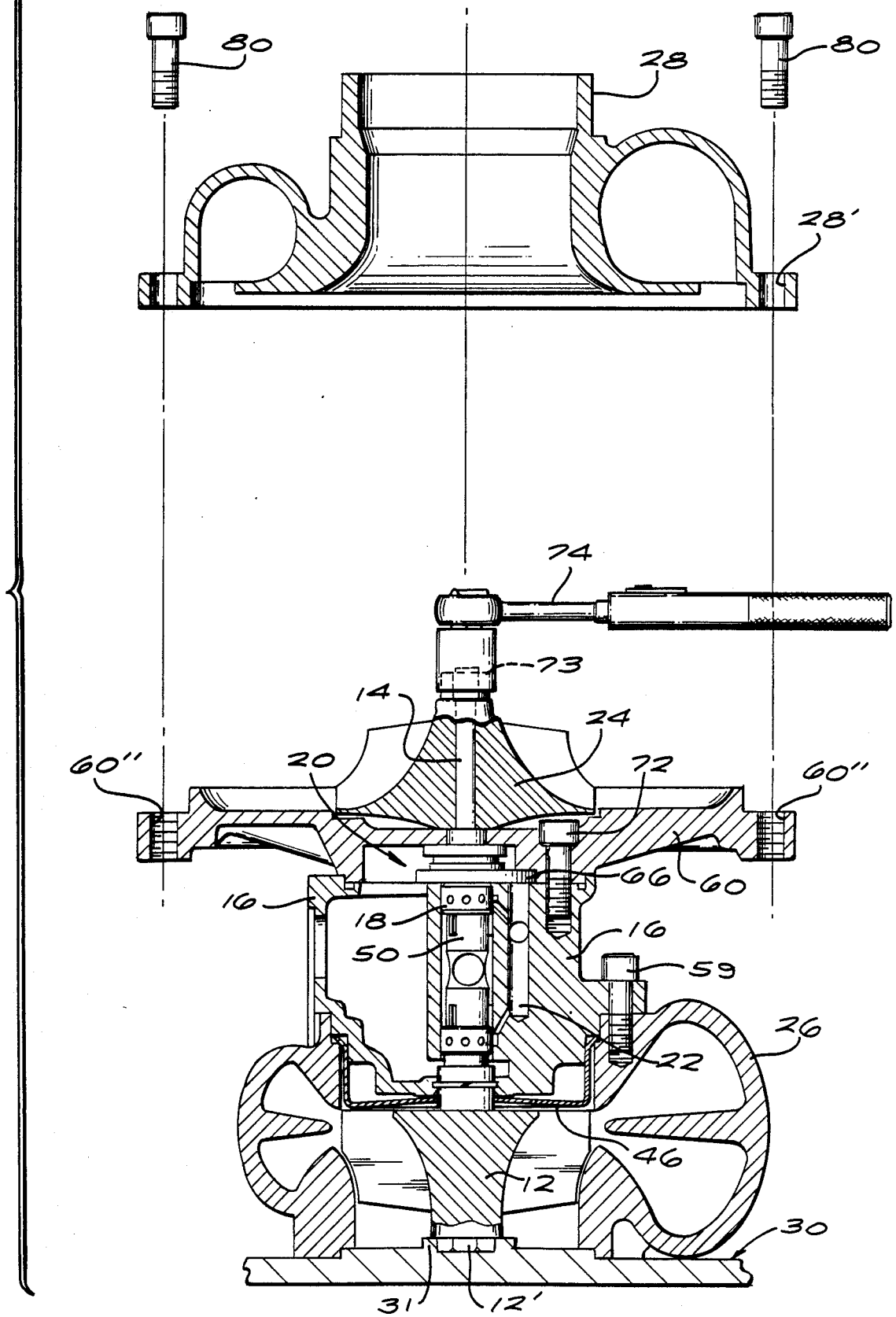
FIG. 10 is an exploded perspective view showing installation of a compressor housing to complete the turbocharger assembly process.

The compressor impeller 24 is installed onto the upper end of the turbocharger shaft 14 by simple sliding placement thereon. An internally threaded nose 73 formed integrally with the impeller 24 threadably attaches to the shaft 14. As part of the final assembly, a torque wrench 74 (FIG. 10) is used for securing the impeller 24 onto the shaft 14 with a selected torque load. This torque step is performed quickly and easily since the rotating components of the turbocharger are locked against rotation by reception of the hex nose 12' on the turbine wheel within the fixture socket 31. Importantly, mounting of the impeller 24 insures accurate axial location of the various rotating components of the turbocharger relative to the thrust bearing 66, which is in turn seated as a reference between the center housing 16 and backplate 60.

To complete the turbocharger assembly, the compressor housing 28 is mounted quickly and easily onto the compressor backplate 60 by means of additional mounting bolts 80 or the like. Again, these mounting bolts 80 are easily located through exposed bolt holes 28' in the compressor housing for reception into threaded bores 60" in the backplate. The resultant assembled turbocharger can then be removed from the fixture 30 for appropriate shipment and/or installation, as desired. Importantly, the entire installation process has occurred without removing the turbine housing 26 or any other sequently installed component from the fixture 30. Moreover, inversion of turbocharger components during any step of the process has not occurred.

Figure 11:
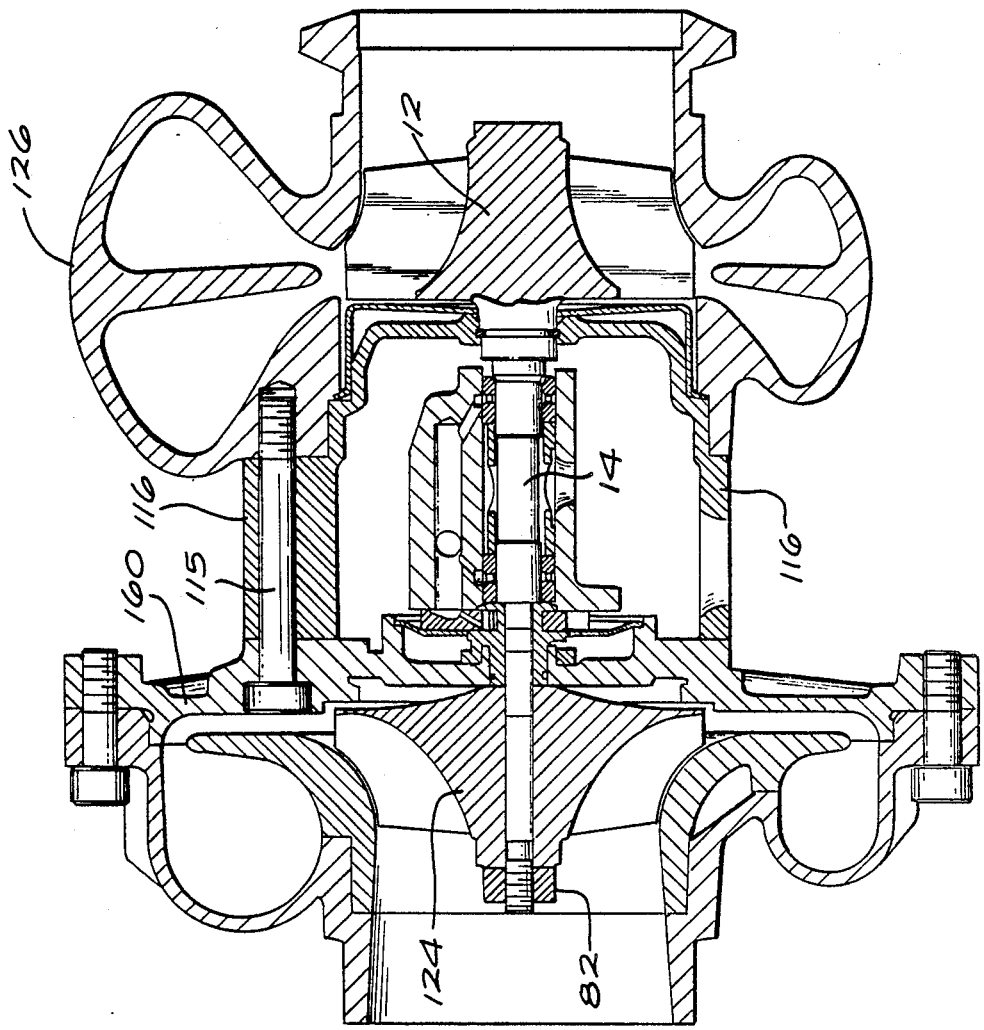
FIG. 11 is a longitudinal vertical sectional view similar to FIG. 1, but illustrating an alternative form of the invention.

FIG. 11 depicts one alternative form of the invention, wherein a single set of elongated mounting bolts 115 is utilized to connect a center housing 116 in sandwich relation between a compressor backplate 160 and a turbine housing 126. In addition, as viewed in FIG. 11, a separate torque nut 82 may utilized at the nose end of a compressor impeller 124 for locking the compressor impeller onto a turbocharger shaft 14. Other components of the turbocharger assembly depicted in FIG. 11 correspond with those described above with respect to FIGS. 1-10.

The turbocharger assembly 10 of the present invention thus provides a simplified turbocharger construction defined by a plurality of components adapted for unidirectional assembly at a single manufacturing work station. All of the bolts include bolt heads and shanks oriented in the same direction, namely, parallel with the turbocharger shaft with the bolts shanks projecting toward the turbine end. Manual handling and movement of the turbocharger and its components through a succession of stations is thus not required during the manufacturing process. This assembly further accommodates rapid and easy disassembly for convenient repair or other maintenance purposes.

A variety of further modifications and improvements to the present invention will be apparent to those skilled in the art. Accordingly, no limitation on the invention is intended by way of the foregoing description and accompanying drawings, except as set forth in the appended claims.

What is claimed is:

1. A unidirectional turbocharger assembly, comprising:
   a turbine housing having an outboard side and an inboard side, and defining internal passages for flow of engine exhaust gases therethrough;
   a turbine wheel having a size and shape for relatively free reception into said turbine housing through the inboard side thereof;
   a turbocharger shaft joined to said turbine wheel and extending generally coaxially therefrom in a direction away from said turbine housing at the inboard side thereof;
   bearing means receivable onto said shaft, said turbocharger shaft defining a stepped shoulder interposed axially between said bearing means and said turbine wheel;
   a center housing mountable over said shaft and said bearing means into engagement with the inboard side of said turbine housing;
   thrust bearing means mountable over said shaft;
   a compressor backplate mountable onto said center housing at a position generally opposite said turbine housing, said backplate having a central opening therein for passage of said shaft therethrough, said thrust bearing means being interposed in axially fixed relation between said backplate and said center housing, and said stepped shoulder cooperating with said thrust bearing means for axially retaining said bearing means;
   a compressor impeller for mounting onto said shaft at a position generally at the side of said backplate opposite said center housing;
   a compressor housing for mounting onto said backplate and defining internal passages for flow of gases therethrough; and
   fastener means accessible from a common direction for fastening said center housing securely between said turbine housing and said backplate, and for fastening said compressor housing to said backplate.

2. The turbocharger assembly of claim 1 further including a heat shield interposed between said turbine housing and said center housing.

3. The turbocharger assembly of claim 1 further including thrust bearing means interposed axially between said backplate and said center housing for axially retaining said shaft.

4. The turbocharger assembly of claim 1 wherein the end of said shaft opposite said turbine wheel is threaded, and wherein said compressor impeller includes an integrally formed nut for mounting said impeller to said shaft.

5. The turbocharger assembly of claim 1 wherein said compressor impeller is mounted onto said shaft in axially bearing engagement with said thrust bearing means.

6. The turbocharger assembly of claim 1 wherein said fastener means are oriented with their shanks projecting generally in parallel with said shaft in a direction toward the turbine end of the turbocharger.

7. The turbocharger assembly of claim 6 wherein said plurality of fastener means comprises a first set of bolts for fastening said center housing to said turbine housing, a second set of bolts for fastening said backplate to said center housing, and a third set of bolts fastening said compressor housing to said backplate.

8. The turbocharger assembly of claim 6 wherein said plurality of fasteners means comprises a first set of bolts for fastening said backplate and center housing and turbine housing together in stacked relation, and a second set of bolts for fastening said compressor housing to said backplate.

9. The turbocharger assembly of claim 1 further including a support fixture for removably supporting said turbine housing at the outboard side thereof, said fixture including means for engagement with said turbine wheel to lock said turbine wheel against rotation.

10. The turbocharger of claim 1 wherein said shaft has a radially compressible piston ring mounted thereon at a position adjacent said turbine wheel, said center housing including a turbine end wall having an opening therein for reception of said shaft and said piston ring, said end wall defining a chamfered leading edge surrounding said opening for radially compressing said piston ring when said center housing is mounted onto said shaft and moved into engagement with said turbine housing.

11. A method of assembly for a turbocharger, comprising the steps of:
    seating a turbine housing on a support fixture with an inboard side of the turbine housing exposed in a direction away from the fixture;
    installing a turbine wheel into the turbine housing through the inboard side thereof, said turbine wheel being joined to a turbocharger shaft extending along an axis in a direction away from the turbine housing;
    installing bearing components over the shaft, said shaft defining a stepped shoulder at a position axially between the turbine wheel and the bearing components;
    mounting a center housing onto the turbine housing by sliding the center housing over the shaft and into engagement with the turbine housing;
    installing a thrust bearing unit onto the shaft;
    mounting a compressor backplate onto the center housing at a position generally opposite the turbine housing to axially fix the thrust bearing unit between the center housing and backplate, such that the thrust bearing unit and stepped shoulder cooperatively axially retain the bearing components;
    fastening the center housing securely between the turbine housing and backplate;
    mounting a compressor impeller onto the shaft;
    mounting a compressor housing over the compressor impeller into engagement with the backplate; and
    fastening the compressor housing to the backplate;
    said fastening steps including mounting a plurality of fastener means oriented to extend generally in parallel and in a common direction.

12. The method of claim 11 wherein the fastener means are mounted to extend in parallel with the shaft and in a direction toward the turbine end of the turbocharger.

13. The method of claim 12 wherein said fastening steps include connecting the center housing to the turbine housing with a first set of bolts, connecting the backplate to the center housing with a second set of bolts, and connecting the compressor housing to the backplate with a third set of bolts.

14. The method of claim 12 wherein said fastening steps include connecting the center housing between the backplate and compressor housing with a first set of bolts, and connecting the compressor housing to the backplate with a second set of bolts.

15. The method of claim 11 further including the step of interlocking the turbine wheel with the fixture to prevent turbine wheel rotation.

16. The method of claim 11 wherein said assembly steps proceed without removing said turbine housing from the fixture.

17. The method of claim 11 wherein said compressor impeller mounting step includes mounting the impeller in axially bearing engagement with the thrust bearing unit.

18. The turbocharger assembly of claim 1 wherein said fastener means includes a plurality of bolts each having a bolt head and a threaded bolt shank, said bolts being oriented generally in parallel with their respective bolt shanks projecting from the bolt heads in a common direction.

* * * * *